March 19, 1968 V. E. ALLISON 3,373,885
LOADING ATTACHMENT
Filed July 8, 1966 3 Sheets-Sheet 3
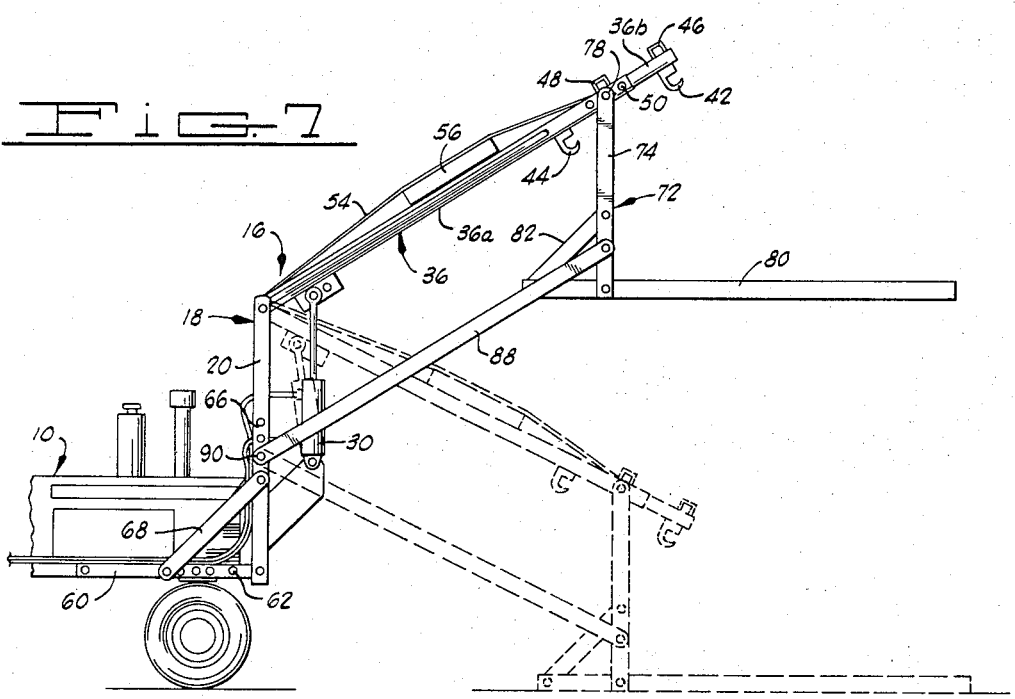
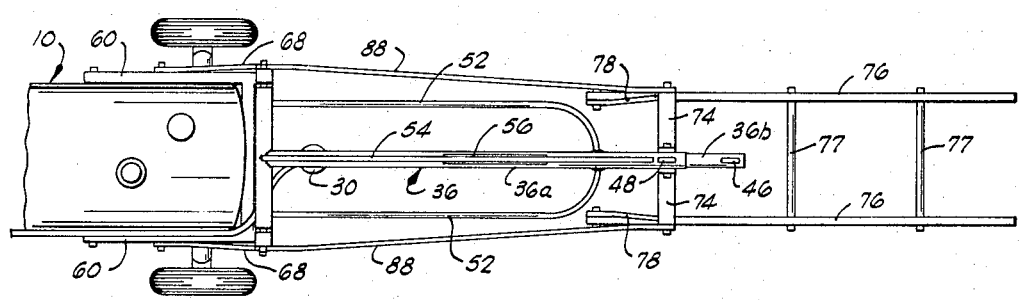
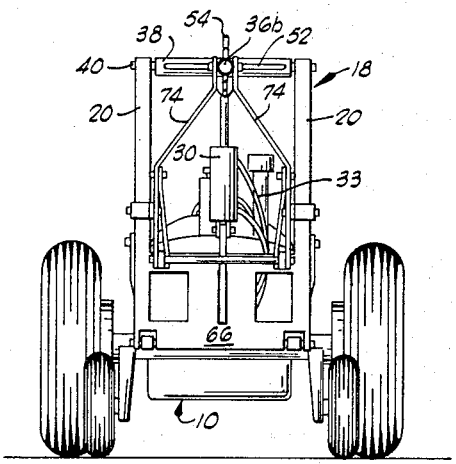
INVENTOR.
VIRGIL E. ALLISON
BY
ATTORNEYS

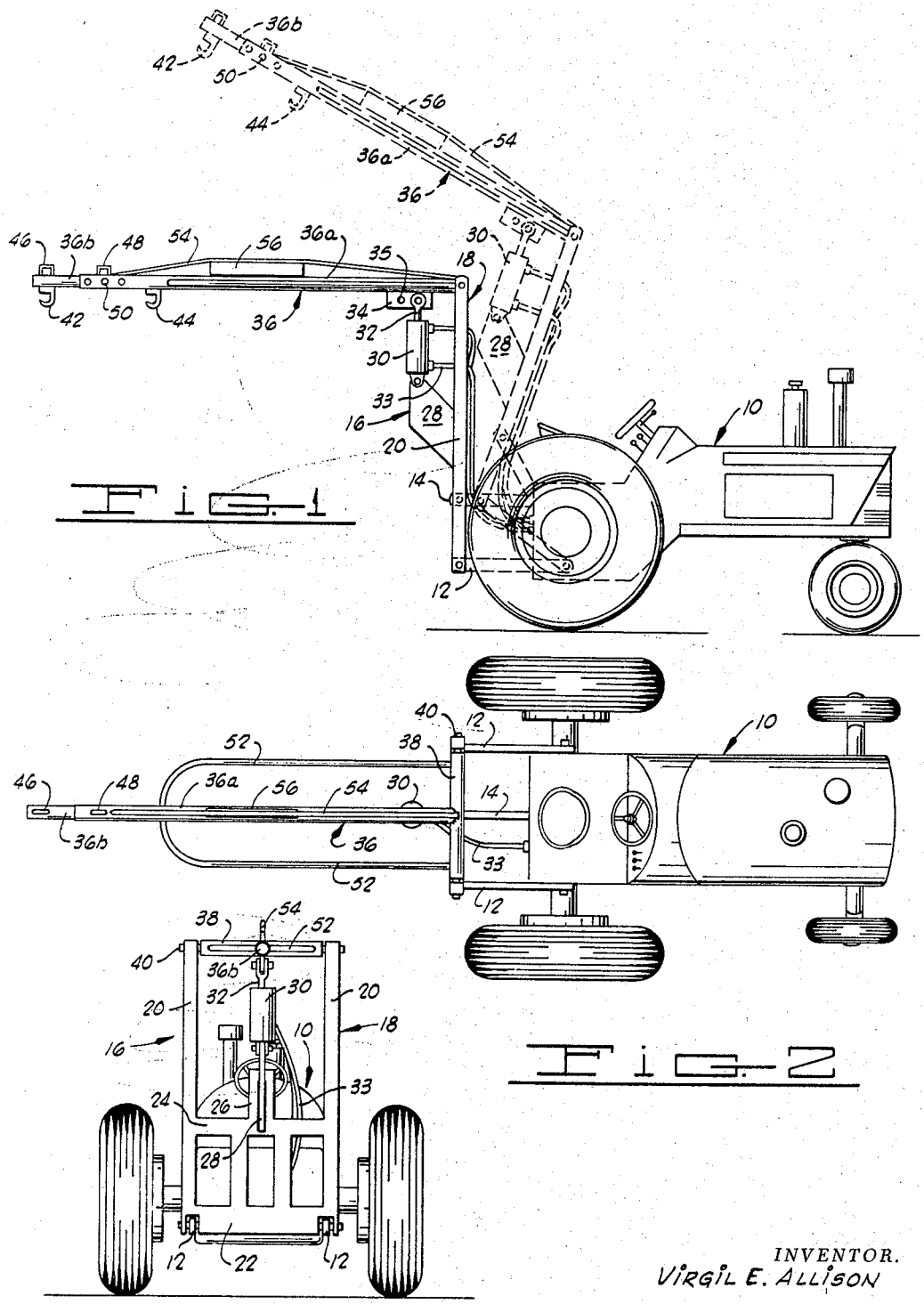

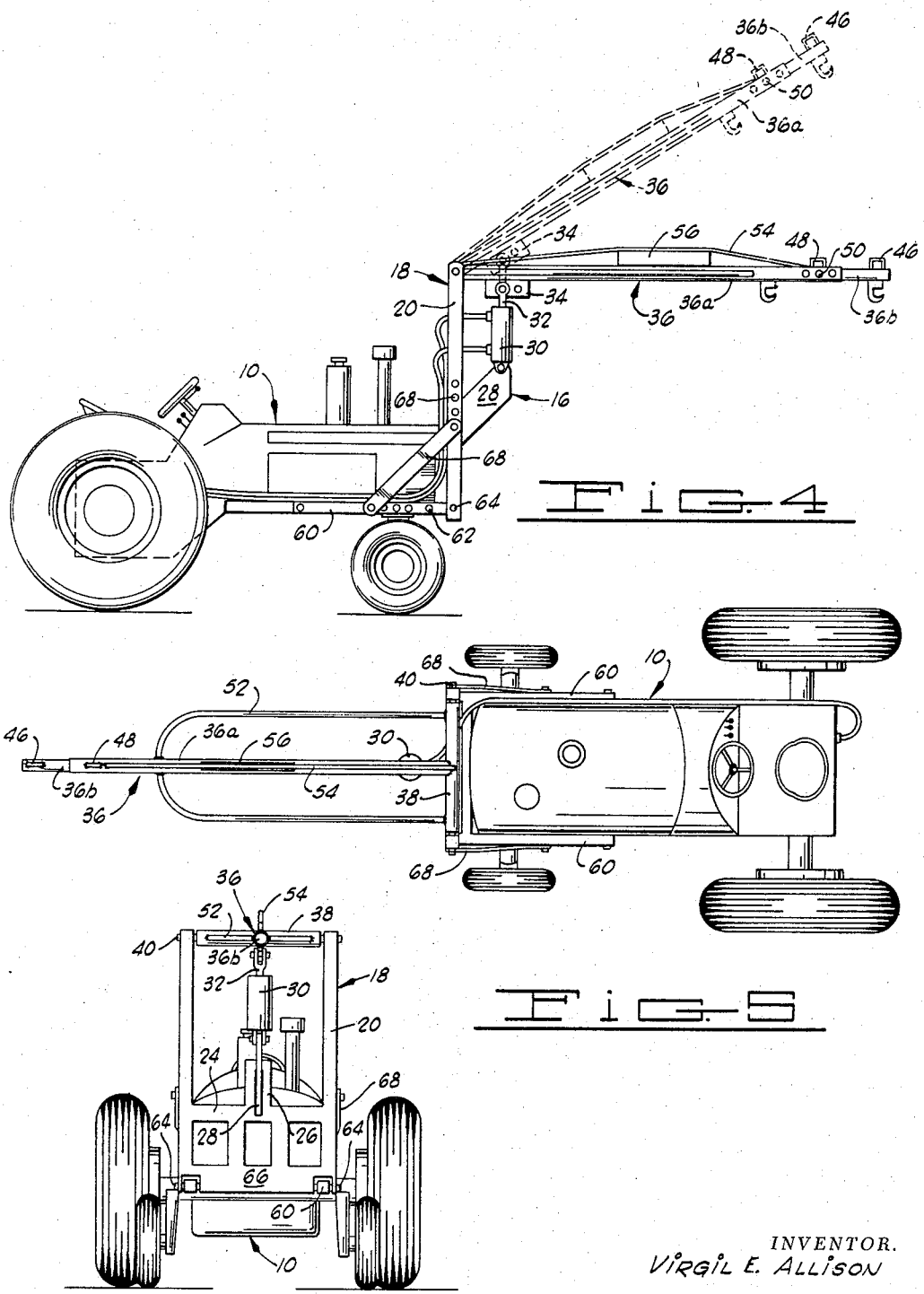

United States Patent Office 3,373,885
Patented Mar. 19, 1968

3,373,885
LOADING ATTACHMENT
Virgil E. Allison, Rte. 1, Box 92,
Morris, Okla. 74445
Filed July 8, 1966, Ser. No. 563,876
3 Claims. (Cl. 214—131)

ABSTRACT OF THE DISCLOSURE

A load-lifting apparatus useful in combination with a self-powered vehicle having a three point hitch and including a vertically extending boom supporting assembly of generally rectangular configuration, an elongated boom having an end pivotally connected to the upper end of the boom supporting member for pivotation about a horizontal axis, a hydraulic cylinder support plate secured to the boom supporting member intermediate its length, and a hydraulic piston and cylinder assembly spaced from the boom supporting assembly, supported at one of its ends by the hydraulic cylinder support plate and connected at its other end to the elongated boom between the ends thereof. The vertically extending boom supporting assembly includes a pair of horizontally spaced, parallel, vertically extending beams which are connected at their lower ends to the outer hitch links of the three point hitch, and which are connected at their upper ends to a horizontal rod which journals a transversely extending sleeve to which the pivoted end of the elongated boom is secured.

This invention relates to an attachment for self-propelled vehicles, and particularly for farm vehicles, which attachment can be used for lifting heavy weights from the ground to an elevated position. More specifically, this invention relates to a versatile lift mechanism which can be used for lifting heavy equipment by means of a sling or by a fork lift attachment, with the lifting force being derived from the prime mover of a tractor to which the lifting device is attached.

A number of types of cranes, booms, hydraulically operated lifts and similar mechanisms have been proposed for attachment to different types of vehicles, either for permanent attachment thereto, or for quick attachment and detachability where a need for this feature exists, and where the vehicle to which it is attached is widely used for other purposes. Frequently, such devices have been expensive to manufacture and require frequent maintenance and, in other instances, only one particular type of lifting action is provided so that the use of the device is limited to certain specific applications.

The present invention provides an improved loading or lift attachment for use in conjunction with self-propelled vehicles, such as those typically characterized by farm tractors. The devices can be utilized in a number of different ways, such as for lifting agricultural implements, for lifting bales of agricultural products, and for providing a fork lift which can be quickly secured to the attachment for use in conjunction therewith, and which is useful for smoothly lifting relatively flat items to a substantial height from ground level.

Broadly described, the present invention comprises a generally vertically extending boom supporting member having secured thereto at its lower end, means for attaching the boom supporting member to a self-propelled vehicle, and particularly, to a farm tractor. In its broadest concept, the lift can be secured to either the front or rear of the tractor, and when secured to the rear of the tractor, can be operated through the use of a conventional three point hitch which is provided on vehicles of the type described. The lift attachment further includes an elongated boom having a free end and having its other end pivotally connected to the boom supporting member adjacent the upper end thereof. The elongated boom is provided with chain hook means which are spaced along the boom and provide points of selective attachment of chains or cables to the boom when it is desired to secure these flexible elements around a drum, a cotton bale, an agricultural implement or other heavy load which is to be lifted by use of the invention. Truss means extend along and mechanically reinforce the elongated boom, and in the preferred embodiment of the invention take the form of a pair of elongated curved rods secured to each side of the boom and extending to the vertically extending boom supporting member, and a truss rod secured along the top of the boom between the ends thereof.

A hydraulic cylinder support plate is secured to the boom supporting member intermediate the ends thereof and has an upper end which is spaced horizontally from the vertically extending boom support member in the direction of the free end of the boom. This cylinder support plate is secured to and supports hydraulic piston and cylinder means which is connected between the upper end of the support plate and the boom at a point along the boom which is spaced from its point of pivotal connection to the boom supporting member. Preferably, the piston extends from the hydraulic cylinder along, and moves in, a line which is parallel to the general plane occupied by the vertically extending boom supporting member. Means are provided for connecting the hydraulic cylinder to a source of hydraulic power located on the tractor or other self-powered vehicle. In the preferred embodiment of the invention, the described lift attachment is further characterized to include a fork lift element which is quick detachably connected to the boom and to the vertically extending boom supporting member, and can be used for lifting from ground level to a desired height, a large weight having a relatively flat lower surface.

One of the main advantages of the described construction over the types of tractor mounted lift devices which have been heretofore proposed is in the arrangement relative to each other of the vertically extending boom support member, the boom itself and the hydraulic piston and cylinder means which actuates the boom. The latter structure is positioned so that it affords a minimum amount of interference with heavy, bulky articles lifted by the boom, and yet permits the article to be elevated to a relatively great height. The possibility of quickly attaching the fork lift element to the boom is also an important feature of the invention which has not been proposed in any prior devices with which applicant is familiar, and which impart greater flexibility and versatility to the structure.

From the foregoing description of the invention, it will have become apparent that it is an important object of the present invention to provide an improved, relatively simply constructed lift device for attachment to farm tractors and other self-powered vehicles.

Another object of the invention is to provide a lift device which can be operated in association with a fork lift element which can be quickly and easily attached to, or disconnected from, the boom and boom supporting portions of the lift device.

An additional object of the invention is to provide a relatively economically constructed, mechanically sturdy detachable lift device which can be quickly mounted on either the front or the back of farm vehicles with a minimum of difficulty, and which can be used for lifting heavy weights to relatively great height.

In addition to the foregoing described objects and advantages, additional objects and advantages will become apparent from the following detailed description of the invention when it is considered in conjunction with the accompanying drawings which illustrate certain specific embodiments of the invention.

In the drawings:

FIGURE 1 is a view in elevation of one embodiment of the invention as it appears when detachably mounted on the rear of an agricultural tractor.

FIGURE 2 is a plan view of the embodiment of the invention illustrated in FIGURE 1.

FIGURE 3 is a view in elevation of the embodiment of the invention depicted in FIGURE 1 as it appears when viewed from the rear of the tractor.

FIGURE 4 is a view in elevation of a slightly modified embodiment of the invention as it appears when mounted on the front end of an agricultural tractor.

FIGURE 5 is a plan view of the embodiment of the invention illustrated in FIGURE 4.

FIGURE 6 is a view in elevation of the embodiment of the invention depicted in FIGURE 4 as it appears when viewed from the front end of the tractor on which it is mounted.

FIGURE 7 is a view in elevation of a further modification of the invention which includes a fork lift attachment, and showing the invention as it appears when viewed from the side of a tractor on which it is mounted.

FIGURE 8 is a plan view of the embodiment of the invention depicted in FIGURE 7.

FIGURE 9 is a view in elevation of the embodiment of the invention depicted in FIGURE 7 as it appears when viewed from the front of the tractor on which it is mounted.

Referring now to the drawings in detail, and initially to FIGURE 1, reference character 10 designates a farm tractor of conventional type having a three-point hitch connection to whcih can be connected harrows, plows and other types of agricultural implements. The three-point hitch connection has been rather schematically illustrated and includes a pair of outer links 12 and a central, elevated link 14. This three-point hitch connection is manipulated by the operator of the tractor in a conventional manner well understood in the art, and will not be further discussed herein except in referring to the operation of the lift attachment as hereinafter described.

The lift or loading attachment of the invention is referred to generally by reference numeral 16 and includes a generally vertically extending boom support member 18. The generally vertically extending boom support member 18 takes the form of a generally rectangular framework in the illustrated embodiment. The support member 18 thus includes a pair of parallel, vertically extending beams 20 which are connected at their lower ends by a horizontally extending plate 22 and intermediate their ends by a transverse brace 24. A mounting plate 26 extends vertically upwardly from the transverse brace 24 in substantially coplanar alignment with the beams 20 and serves as an anchor point for supporting a cylinder support plate 28. The cylinder support plate 28 projects rearwardly and upwardly from the mounting plate 26 so that its upper end is spaced horizontally from the boom support member 18. The lower end of a double acting hydraulic cylinder 30 is pivotally secured to the upper end of the cylinder support plate 28 and the hydraulic cylinder encloses one end of a reciprocating piston 32, the other end of which is secured to an apertured plate 34. Suitable hydraulic power fluid conduits 33 are connected to opposite ends of the cylinder 30 in conventional fashion.

The plate 34, which contains a plurality of apertures 35, is secured to the under side of an elongated boom 36. The boom 36 is preferably formed as a pair of telescoping boom sections 36a and 36b, with each of the boom sections carrying apertures (not visible) which can be aligned or selectively brought into registration so that a desired relationship between the boom sections can be achieved by passing a locking pin through the aligned apertures. The elongated boom 36 is secured at one of its ends to a transverse tubular member 38 extending between the upper ends of the beams 20 and pivotally journaled on a bar 40 which interconnects the upper ends of the beams. The boom 36 is thus free to pivot about a horizontal axis and is driven in its pivotal movement by the double acting hydraulic cylinder 30 and its associated piston 32. It will be noted that the upper end of the piston rod 32 can be secured in a selected one of the apertures 35, and that the hydraulic cylinder 30 is pivotally attached to the upper end of the cylinder support plate 28. This permits the leverage and extent of movement of the elongated boom 36 to be varied considerably, and also permits the cylinder 30 to be moved to a more retracted, out-of-the-way position when this is desirable.

The elongated boom 36 carries a pair of chain hooks 42 and 44 spaced from each other along its length, with one of the hooks preferably being adjacent the outer or free end of the boom. The hooks depend downwardly from the boom when it is in its horizontal position and are used for securing chains thereto which can be engaged with the heavy object to be lifted by the apparatus. A pair of U-shaped brackets 46 and 48 are secured to the top of the boom and are used for securing chains or other fastening members thereto. A plurality of apertures 50 extend through the elongated boom 36 at points relatively close to its free outer end, and are utilized in attaching a fork lift element to the boom and to the generally vertically extending boom support member as hereinafter described.

The elongated boom 36 is mechanically reinforced by a pair of elongated rods 52 which are positioned on opposite sides of the boom and are secured at one of their ends to the tubular member 38 and at their other ends to the boom. A reinforcing truss rod 54 is also secured at one of its ends to the end of the boom which is secured to the tubular member 38, and at its other end to the outer end of the boom. The truss rod 54 is maintained in tension across a spacer block 56 which is welded or otherwise suitably secured to the upper surface of the elongated boom 36.

OPERATION

In the operation of the lift device of the invention, the generally vertically extending boom supporting member 18 is initially secured to the three point hitch connection of the tractor by pivotal connections to the outer links 12 and the central link 14 in the manner depicted in FIGURE 1. The hydraulic fluid conduits 33 are connected by the double acting hydraulic cylinder 30 in a manner well understood in the art, and the device is ready for operation. When it is desired to lift a heavy article, such as farm machinery, a cotton bale or the like, suitable chains or other flexible members are secured either to the chain hooks 42 and 44, or through the U-shaped brackets 46 and 48, and are extended around, or attached to, the article to be lifted. The operator of the tractor can lift the article from the ground in one of two ways. Either the power connections to the hitch links 12 and 14 can be actuated to move the lift device to the position shown in dashed lines in FIGURE 1, such movement involving only an upward movement of the vertically extending boom support member 18 with concurrent pivotation of this member about a horizontal axis. Alternatively, the tractor operator may operate controls which deliver hydraulic power fluid to the double acting hydraulic cylinder 30 to cause the elongated boom 36 to be biased upwardly about its pivotal axis in the bar 40. It should also be pointed out as a very important feature of the invention that when both the three point hitch connection and the hydraulic cylinder 30 are simultaneously used to elevate the boom 36, the outer end of the boom can be lifted to a very high elevation, and can be brought almost over the rear of the tractor. It will be noted that the position of the hydraulic cylinder 30 permits maximum unobstructed operating space to be obtained beneath the boom 36 and also permits maximum vertical movement of the outer free end of the boom with a relatively short stroke of the piston 32. Moreover, the illustrated construction transfers substantially all of the weight of the article lifted through the vertically extending boom support member 18 to the rear of the tractor. Other important advantages of the depicted structure are the economy with which it may be manufactured, its ease of use, and the relative simplicity and ruggedness of construction which assure it of an extended operating life with very little maintenance requirement.

A slightly modified embodiment of the invention is depicted in FIGURES 4–6. Since a number of structural elements appearing in this embodiment of the invention are identical to structural elements depicted in the embodiment illustrated in FIGURES 1–3, identical reference numerals have been used for the identification of identical structural elements. The primary area of modification of the embodiment of the invention shown in FIGURES 4–6 with respect to that shown in FIGURES 1–3 is in the adaptation of the lift or loading apparatus to attachment to the front end of the tractor 10. Detachably secured to the framework of the tractor on opposite sides thereof are a pair of elongated bars 60 which include adjacent the front end thereof a plurality of apertures 62, the purpose of which will be hereinafter explained. At the front end of the bars 60, an elongated rod 64 extends transversely across the front of the tractor and is horizontally spaced therefrom. The opposite ends of the rod 64 extend through the bars 60 and project horizontally beyond the outside of these bars for a slight distance. Journaled on the rod 64 is a base plate 66 forming a part of a framework which forms the vertically extending boom supporting member 18 hereinbefore described. The base plate 66 is slotted adjacent its opposite sides to permit the bars 60 to extend therethrough, and is apertured to receive the rod 64 which extends transversely between the bars 60 (see FIGURE 3).

The generally vertically extending boom supporting member 18 and the elongated boom 36 are constructed in substantially the same way as has been previously described, with the exception that the beams 20 of the boom supporting member 18 are provided intermediate their length with a plurality of apertures 66 which facilitate the attachment to the vertically extending boom supporting member of the fork lift element as hereinafter described. The inclination of the boom supporting member 18 with respect to the vertical can be adjusted by means of diagonal braces 68 which extend from the beams 20 to the respective bars 60 on opposite sides of the tractor engine.

The operation of the embodiment of the invention depicted in FIGURES 4–6 is substantially the same as has been described as characteristic of the embodiment illustrated in FIGURES 1–3 except that the automatic raising and inclining function of the three point hitch connection is absent. Instead, if it is desired to incline the vertically extending boom supporting member 18 with respect to the vertical, this is accomplished by adjustment of the angular inclination of the diagonal braces 68 using a selected one of the apertures 62 in the bars 60.

A further modification of the invention is illustrated in FIGURES 7–9. Here the lift or loading attachment is constructed substantially identically to that which has been depicted in FIGURES 4–6 and previously described, but the attachment has been modified by the inclusion of a fork lift element designated generally by reference numeral 72. The fork lift element 72 can be quickly and easily secured to the lift attachment and is highly useful where it is desired to raise substantially flat bottomed, heavy objects from ground level to an elevated position. The fork lift element 72 includes a pair of diverging, generally vertically extending bars 74 which are pivotally secured at their upper ends to the elongated boom 36 by a suitable pin 78 inserted through one of the apertures 50. At their lower ends, the bars 74 are each secured to a horizontally extending beam 80 so that the two beams 80 extend parallel to each other and in a direction away from the tractor 10.

A pair of braces 82 are connected between the ends of the beams 80 nearest the tractor 10, and intermediate portions of the respective bars 74. An elongated guide rod 88 extends from a point adjacent the lower end of each of the bars 74 to a point intermediate the length of one of the beams 20 of the vertically extending boom support member 18, and this end of each of the guide rods 88 is secured by means of a pivot pin 90 in one of the apertures 68. The pins 78 and 90 which are used for attaching or securing the fork lift element 72 to the lift attachment are constructed to facilitate ease of insertion in their respective apertures so that the fork lift element can be quickly and easily placed in operation or removed from the lift attachment whenever desired.

The construction of the fork lift element 72 is preferably such that the bars 74 extend parallel to the vertically extending beams 20 forming a part of the boom support member 18. Further, the elongated guide rods 88 are preferably made to extend parallel to the boom 36. In this way, as the boom 36 is caused to pivot upwardly and downwardly about its pivotal axis by the hydraulic cylinder 30, the beams 80 are caused to remain in their substantially horizontal position and a load can be lifted smoothly and evenly upwardly without fear of its sliding off of the beams 80. In some instances, it may be desirable to slightly incline the beams 80 with respect to the horizontal so that their free outer ends are at a higher vertical level than their points of attachment to the bars 74. This would be the case, for example, where it was desired to place a drum or some other member capable of rolling off of the beams 80 in the angle defined between the beams 80 and the bars 74. This arrangement can be accomplished by adjusting the position at which the bars 74 are attached to the boom 36 and/or position at which the elongated guide rods 88 are secured in a selected one of the apertures 66 in the beams 20. It should further be pointed out that it will often be desirable to use chains or other flexible members passed through the chain hooks 42 and 44, or through the brackets 46 and 48 conjunctively with the fork lift element 72. Thus, it may be desirable to lash or otherwise secure a load which is to be raised to an elevated position upon the beams 80.

From the foregoing description of the invention, it will have become aparent that it is an important object of the invention to provide an improved lift attachment for use on self-powered vehicles, and particularly, upon farm vehicles. The lift attachment can be very economically constructed, is mechanically strong and sturdy and is versatile in its uses.

Although several embodiments of the invention have been herein depicted and described in order to provide examples of its construction and utilization, it is to be understood that various changes and modifications can be made in the described and illustrated structures without departure from the basic principles which underlie the invention. Insofar as these principles are relied on in the construction of similar or closely related devices, such devices are deemed to be circumscribed by the spirit and scope of this invention except as limited by the appended claims or reasonable equivalents thereof.

I claim:

1. In combination with a self-powered vehicle of the type having a vertically movable three point hitch connection, and a source of hydraulic power fluid,
   a generally vertically extending boom supporting member comprising:
   a pair of substantially parallel, horizontally spaced, vertically extending beams connected adjacent their lower ends to the two outer hitch elements of said three point hitch connection;
a horizontally extending plate interconnecting the lower ends of said vertically extending beams;
a transverse brace interconnecting the central portions of said vertically extending beams;
a bar interconnecting the upper ends of said beams; and
a transverse tubular member journaled on said bar between said beams;
hydraulic cylinder support means secured to said transversely brace and having an upper end spaced horizontally from the vertically extending beams of said boom supporting member;
an elongated boom having a free end and having a second end secured to said transverse tubular member for pivotation therewith about said bar;
a hydraulic cylinder having one end secured to the upper end of said cylinder support means;
a piston slidably mounted in said hydraulic cylinder; and
a piston rod connected at one of its ends to said piston and extending from the other end of said hydraulic cylinder and connected to said boom at a point between the ends thereof, said piston and piston rod having a stroke length such that the free end of said boom can be elevated to a point substantially vertically above the point of connection of said three point hitch connection to said boom supporting member when the piston is fully extended from the cylinder, and the three point hitch connection is raised to its full extent.

2. The combination defined in claim 1 and further characterized to include a pair of elongated rods positioned on opposite sides of the boom and having one of their ends secured to the boom at its outer end portion and having the other ends of the rods connected to said transverse tubular member adjacent the opposite ends thereof.

3. The combination defined in claim 1 and further characterized to include fork lift means detachably connected to said boom supporting member and to said elongated boom.

References Cited

UNITED STATES PATENTS

| | | | |
|---|---|---|---|
| 2,385,512 | 9/1935 | Heath | 214—774 |
| 2,789,712 | 4/1957 | Christensen | 214—774 |
| 3,024,916 | 3/1962 | Garnett | 212—8 |
| 3,059,785 | 10/1962 | Buckeye | 212—55 X |

FOREIGN PATENTS

| | | |
|---|---|---|
| 81,951 | 9/1956 | Denmark. |
| 663,948 | 1/1952 | Great Britain. |
| 743,018 | 1/1956 | Great Britain. |
| 497,514 | 9/1954 | Italy. |

HUGO O. SCHULZ, *Primary Examiner.*